Patented Sept. 26, 1922.

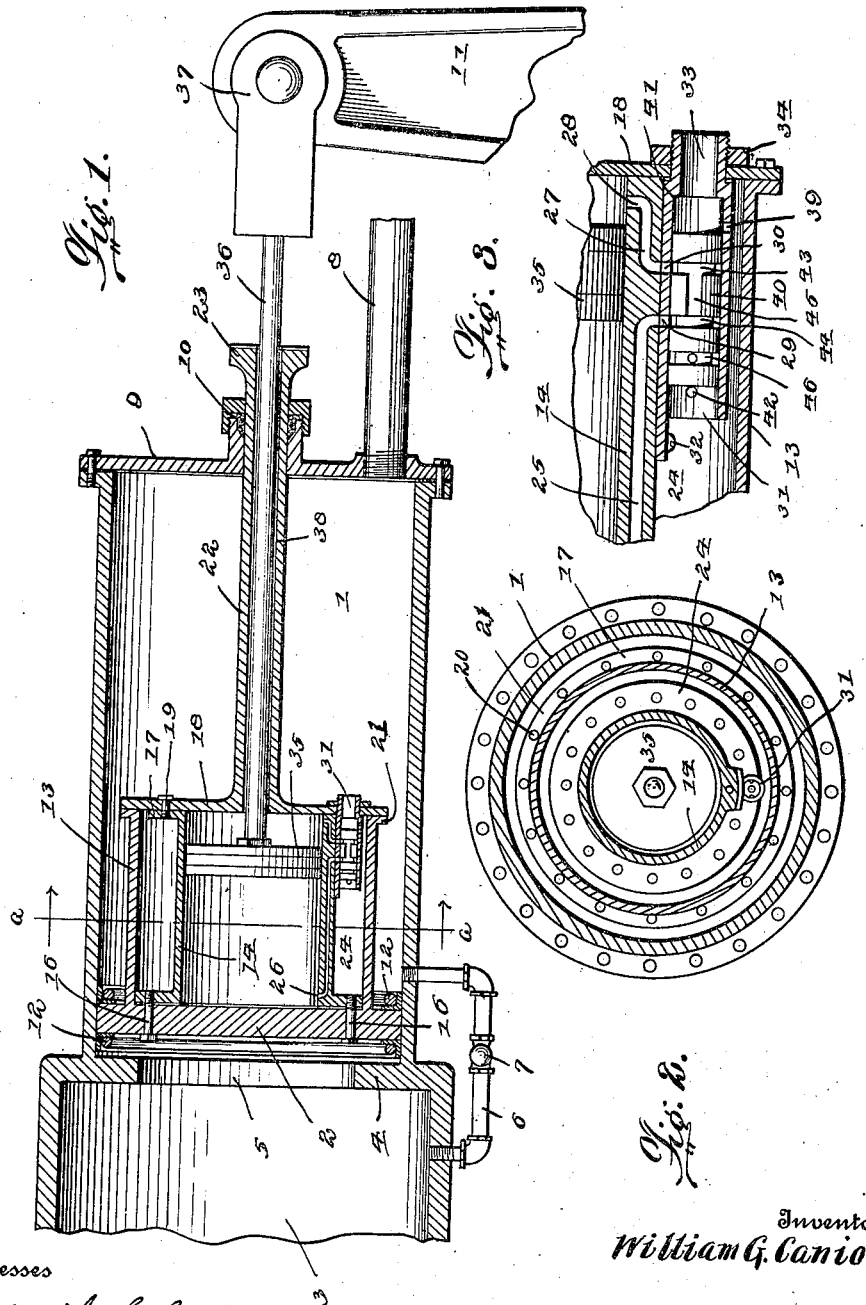

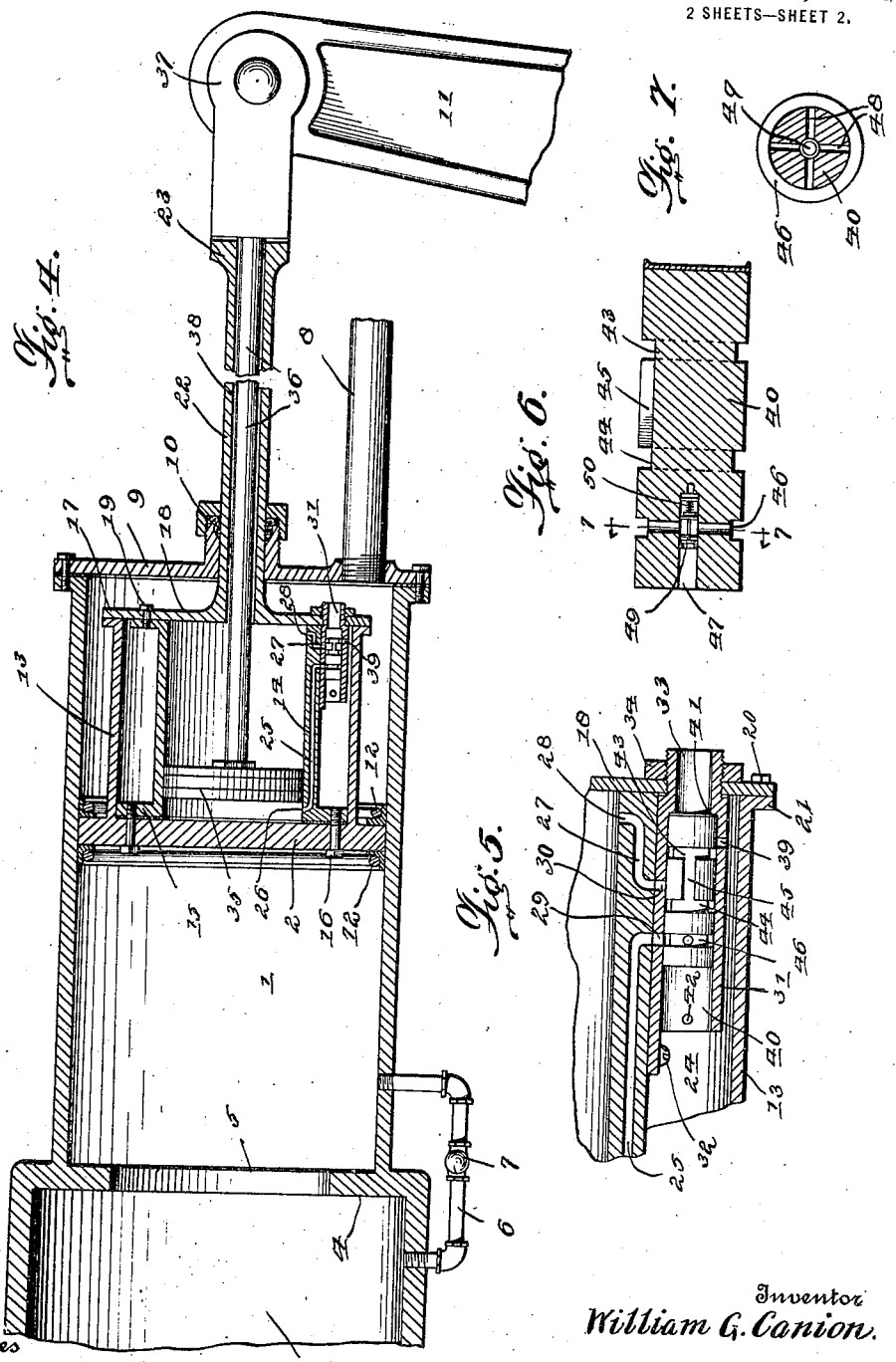

1,430,357

UNITED STATES PATENT OFFICE.

WILLIAM G. CANION, OF BALTIMORE, MARYLAND, ASSIGNOR TO CANION AIR BRAKE COMPANY, OF BISBEE, ARIZONA, A CORPORATION OF ARIZONA.

COMPOUND AIR BRAKE.

Refiled for abandoned application Serial No. 791,809, filed September 25, 1913. This application filed June 28, 1921. Serial No. 481,163.

*To all whom it may concern:*

Be it known that I, WILLIAM G. CANION, a citizen of the United States, residing at Baltimore, in the State of Maryland, have invented certain new and useful Improvements in Compound Air Brakes; and I do hereby declare the following to be a full, clear, and exact description of the invention, such as will enable others skilled in the art to which it appertains to make and use the same.

This invention is an improved compound air brake apparatus adapted to automatically take up the slack in the brake chain and embodying a prime moving slack adjusting piston arranged in and movable independently of the brake applying piston which operates in the brake cylinder, and means for automatically controlling the operation of the said pistons, as hereinafter described and claimed.

One object of my improved invention is to provide improved fluid pressure brake apparatus of this character including a plurality of brake operating pistons and means to utilize a charge to move the pistons to brake applying position and one in advance of another.

Another object of my invention is to provide improved fluid pressure brake apparatus of this character embodying a plurality of brake operating pistons and automatically acting means to utilize a charge to move the pistons to brake applying position one in advance of another.

Another object of my invention is to provide improved fluid pressure brake apparatus of this character embodying a plurality of brake operating pistons and means to utilize a charge to simultaneously move the pistons to brake applying position at different rates of speed.

Another object of my invention is to provide improved compound air brake apparatus which may be used in connection with ordinary air brake apparatus.

Another object is to provide an improved compound air brake apparatus which operates automatically when pressure is reduced through the train pipe and which is at all times under direct control.

Another object of my invention is to provide improved compound fluid pressure brake apparatus which is cushioned when in ordinary brake applying position and prevents the train wheels from becoming locked and flattened.

Another object of my improved invention is to provide improved fluid pressure operated brake apparatus of this character which effects a considerable economy of fluid under pressure in its operation.

Another object of my invention is to provide improved fluid pressure brake apparatus which is cheap and simple, is readily operated, which may be readily installed, and which is not likely to get out of order.

In the accompanying drawings:—

Figure 1 is a vertical longitudinal sectional view of compound air brake apparatus constructed in accordance with my invention and in release position.

Figure 2 is a detail vertical transverse sectional view of the same on the plane indicated by the line $a$—$a$ of Figure 1.

Figure 3 is a detail elevation on a larger scale of the controlling valve for the slack adjusting piston, co-acting parts of the brake operated piston being shown in section.

Figure 4 is a sectional view, similar to Figure 1, and showing the parts in brake setting position.

Figure 5 is a view similar to Figure 3 and showing the controlling valve in brake setting position.

Figure 6 is a detail longitudinal central sectional view of the controlling valve.

Figure 7 is a detail transverse sectional view of the same on the plane indicated by the line 7—7 of Figure 6.

In accordance with my invention, the brake cylinder 1 in which the brake operating piston 2 is mounted is connected to an auxiliary reservoir 3. The cylinder is here shown as arranged directly on one end or head of the auxiliary reservoir, the end 4 of the latter being provided with an opening 5. A by-pass is formed around the piston 2 when the latter is at the inner end of the brake cylinder, and between the brake cylinder and the auxiliary reservoir, this by-pass being here shown as formed by a pipe 6 which is provided with a check valve 7 that closes against back pressure from the auxiliary reservoir. The train pipe 8 is shown connected directly to the outer head 9 of the brake cylinder and the said head is provided with a stuffing box 10. A brake lever is indicated at 11.

A brake operating piston 2 is provided on opposite sides with packing rings 12 and is also provided on its front side with an outer cylinder 13 of less diameter than the brake cylinder and an inner cylinder 14 of less diameter than the cylinder 13 and which is concentrically arranged therein. The cylinder 14 has an outwardly extending annular flange 15 at its rear end, secured to the piston 2 by bolts 16. The outer cylinder 13 has its rear end fitted around said flange. A similar flange 17 is at the front end of the inner cylinder and the common front head 18 of said cylinders 13 and 14 is bolted as at 19 to the flange 17 of the cylinder 14 and also as at 20 to a flange 21 at the front end of the cylinder 13. A tubular rod 22 extends from the center of the head 18 out through the packing box 10 of the head of the brake cylinder, the said tubular rod being provided at its front end with a diametrically enlarged heads 23. An annular chamber 24 is formed between the cylinders 13 and 14 of the piston 2, and constitutes a brake piston carried reservoir.

The wall of the inner cylinder 14 is thickened at a suitable point here shown as at the under side and is provided with a duct 25 which opens into said cylinder 14 near its rear end through a port 26 and is also provided with a duct 27 which opens into the front portion of said cylinder 14 through a port 28. Near the front end of the chamber 24 the said wall of the inner cylinder 14 is provided with ports 29 and 30, respectively for the ducts 25 and 27, the said ports being spaced a suitable distance apart and leading through one side of a tubular valve casing 31. Said valve casing is arranged in the front end of the chamber 24, is bolted or otherwise suitably secured as at 32 to the outer side of the inner cylinder 14, is open at its rear end and is formed at its front end with a reduced tubular portion 33 which projects through an opening in the head 18, is exteriorly threaded and receives a nut 34 which bears against said head.

A primer actuating slack adjusting piston 35 is arranged for reciprocating movement in the inner cylinder 14 of the brake operating piston 2 and has a rod 36 which passes through the tubular rod 22 of the piston 2 and is attached as at 37 to the brake lever 11. The diameter of the piston rod 36 is less than the interior diameter of the tubular rod 22 of the piston 2 so that a duct 38 is formed by the bore of the tubular piston rod 22 around the piston rod 36 and from the front end of the cylinder 14 to the atmosphere.

The valve casing 31 has a port 39 at a suitable distance from its front end and communicating with the chamber 24 between the cylinders 13 and 14 of the piston 2. A cylindrical controlling valve 40 is arranged for reciprocating movement and is fitted in the valve casing 31, its forward movement being limited by the shoulder 41 at the front end of the valve casing and its rearward movement being limited by a stop pin 42 with which the valve casing is provided. This cylindrical valve is provided at a suitable distance from its front end with a pair of spaced annular grooves 43 and 44 which are connected together by a channel 45 and is provided at a suitable distance from its rear end with an annular groove 46. A central longitudinal bore or duct 47 is made in the rear end of the valve 40 which communicates with the groove 46 through radial arms or ducts 48 and in the said duct 47 is a check valve 49 which closes rearwardly and is normally held in closed position by a light spring 50. When the valve 40 is at the forward limit of its movement its cuts off the port 30, its grooves 43 and 44 being on opposite sides of and spaced from the port 30 and its groove 46 is coincident with the port 29 thus establishing connection between the chamber 24 and the interior of the cylinder 14 in rear of the piston 35, through the bore 47, arms 48, groove 46, port 29 and duct 25. When thus located the valve 40 is in service position, this being shown in Figures 4 and 5.

When said valve 40 is moved back, in release position it uncovers the port 39, its groove 43 registers with the port 30 and its groove 44 registers with the port 29 thus affording escape of compressed air from the cylinder 14 in rear of the piston 35 to the atmosphere, through the duct 25, groove 44, channel 45, groove 43 and duct 27 into the front end of said cylinder 14 and from thence out to the air through the duct 38 around the piston rod 36.

The operation of my improved compound air brake apparatus is as follows:—

When a charge of compressed air is admitted to the brake cylinder 1 through the pipe 8 it moves the piston 2 rearwardly and the piston 35 is caused to move with the piston 2 but at a less rate of speed, owing to the presence of escaping air in the front end of the cylinder 14. Compressed air from the cylinder 1 at the same time enters the valve casing 31 through its front end and forces the valve 40 rearwardly, thus opening the port 39 and hence while the reservoir 3 is being charged from the cylinder 1 through the valved by-pass, the chamber 24 is also charged with compressed air and at the same pressure as in the cylinder 1 and auxiliary reservoir 3. The rearward movement of the pistons 2 and 35 causes the brakes to be released as will be understood.

When pressure is reduced through the train pipe 8, pressure in the cylinder 1 becomes less than in the auxiliary reservoir 3 and also becomes less in front of the valve 40 than in the brake piston carried reservoir or chamber 24 and hence the valve 40 moves forwardly thus establishing communication between the reservoir 24 and the cylinder 14 in rear of the piston 35 so that the said piston is moved forwardly and at a higher rate of speed than the piston 2. Such movement of the piston 35 makes an initial application of the brakes and under ordinary circumstances it is not necessary to make such a reduction of pressure in the cylinder 1 as to cause the piston 2 to move forwardly to the full extent but if the reduction is as great as is required in an emergency the piston 2 also can be moved forwardly to the full extent and be caused to apply the head 23 of its tubular piston rod 22 to the brake lever 11. The initial movement of the piston 35 to brake applying position takes up the slack in the brake chains. Only a comparatively slight reduction through the train pipe 8 is necessary to cause the piston 35 to move to brake applying position, the compressed air stored in the brake carried reservoir or chamber 24 is ordinarily sufficient to apply the brakes through the piston 35 and hence a great economy of compressed air is effected. The compressed air in the cylinder 14 behind the piston 35 forms an air cushion which is maintained behind the said piston when applying brakes and hence under ordinary applications of brakes in which the piston 2 is not moved so fully as to apply head 23 to the brake lever, the train wheels are not gripped so tightly by the brake shoes as to be prevented from turning and being worn flat on one side by friction on the track rails. But when, as in an emergency, the engineer reduces through the train pipe 8 to such an extent as to cause the piston 2 to move fully forward and engage the head 23 with the brake lever the entire force of the compressed air in the auxiliary reservoir 3 as well as that in the brake piston carried reservoir 24 can be utilized in applying the brakes.

My improved compound automatic air brake apparatus is under the direct control of the engineer under all conditions, making it unnecessary to adjust to take up the slack in the brake chains and my improved brake can be used, when desired, for operation in connection with ordinary air brake apparatus.

Having thus described my invention, I claim:—

1. In fluid pressure brake apparatus, the combination of a brake cylinder, a main brake piston therein, a cylinder and a charging reservoir therefor both carried by the main brake piston, a prime acting brake piston in the last-named cylinder and means to cause said reservoir to be charged from the brake cylinder and to utilize said charge to move the prime acting brake piston to brake applying position, in advance and independently of the main brake piston.

2. In fluid pressure brake apparatus, the combination of a brake cylinder, a main brake piston therein, a cylinder and a charging reservoir therefor both carried by the main brake piston, a prime acting brake piston in the last named cylinder and fluid pressure actuated means, to cause said reservoir to be charged from the brake cylinder and to utilize said charge to move the prime acting brake piston to brake applying position in advance and independently of the main brake piston.

3. In fluid pressure brake apparatus, the combination of a brake cylinder, a main brake piston therein, a cylinder and a charging reservoir therefor both carried by the main brake piston, a prime acting brake piston in the last-named cylinder and a fluid pressure actuated controlling valve, operative upon variations in pressure through the train pipe to cause said reservoir to be charged from the brake cylinder and to utilize said charge to move the prime acting brake piston to brake applying position in advance and independently of the main brake piston.

4. In fluid pressure actuated brake apparatus, the combination of a brake cylinder, an auxiliary reservoir directly connected and discharging into one end of the cylinder, a by-pass connection of reduced capacity connecting said brake cylinder and auxiliary reservoir, a main brake piston in the brake cylinder, a cylinder and a charging reservoir therefor both carried by the main brake piston, a prime acting brake piston in the last named cylinder and a controlling valve to cause said reservoir to be charged from the brake cylinder and to utilize said charge to move the prime acting brake piston to brake applying position in advance and independently of the main brake piston.

5. In fluid pressure actuated brake apparatus the combination of a brake cylinder, an auxiliary reservoir directly connected and discharging into one end of the cylinder, a by-pass connection of reduced capacity connecting said brake cylinder and auxiliary reservoir, a check valve in said by-pass connection to close against back pressure from the auxiliary reservoir, a main brake piston in the brake cylinder, a cylinder and a charging reservoir therefor both carried by the main brake piston, a prime acting brake piston in the last-named cylinder and a controlling valve to cause said reservoir to be charged from the brake cylinder and to utilize said charge to move the prime acting brake piston to brake applying position in advance and independently of the main brake piston.

6. In fluid pressure brake actuated apparatus the combination of a brake cylinder, a main brake piston therein, a cylinder and a charging reservoir therefor both carried by the main brake piston, said cylinder having ducts leading from opposite ends thereof to the said charging reservoir and said charging reservoir having a direct connection with said brake cylinder and a controlling valve to cause said charging reservoir to be charged from and with the brake cylinder, to also cause the charge in the charging reservoir to be utilized for moving the prime acting brake piston to brake applying position when the main brake piston is moving to such position, but at a higher rate of speed, and to exhaust from the main brake piston carried cylinder when the brake cylinder is recharged.

In testimony whereof, I affix my signature.

WILLIAM G. CANION.